June 17, 1941.　　　W. SCHAELCHLIN　　　2,246,323

SHOCK AND VIBRATION PROOF MOUNTING FOR CONTROL APPARATUS

Filed Nov. 6, 1937　　　3 Sheets-Sheet 1

WITNESSES:

INVENTOR
Walter Schaelchlin.
BY
ATTORNEY

June 17, 1941. W. SCHAELCHLIN 2,246,323
SHOCK AND VIBRATION PROOF MOUNTING FOR CONTROL APPARATUS
Filed Nov. 6, 1937 3 Sheets-Sheet 2
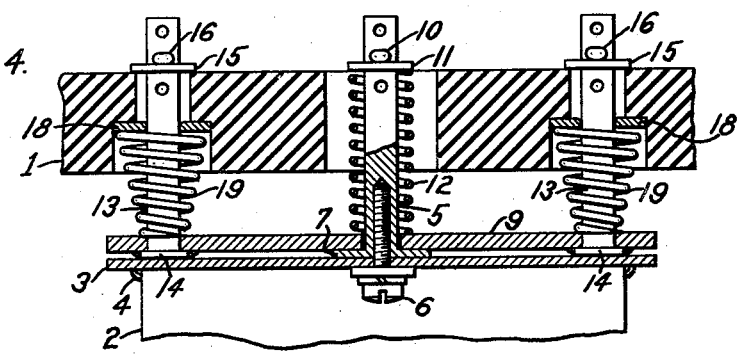
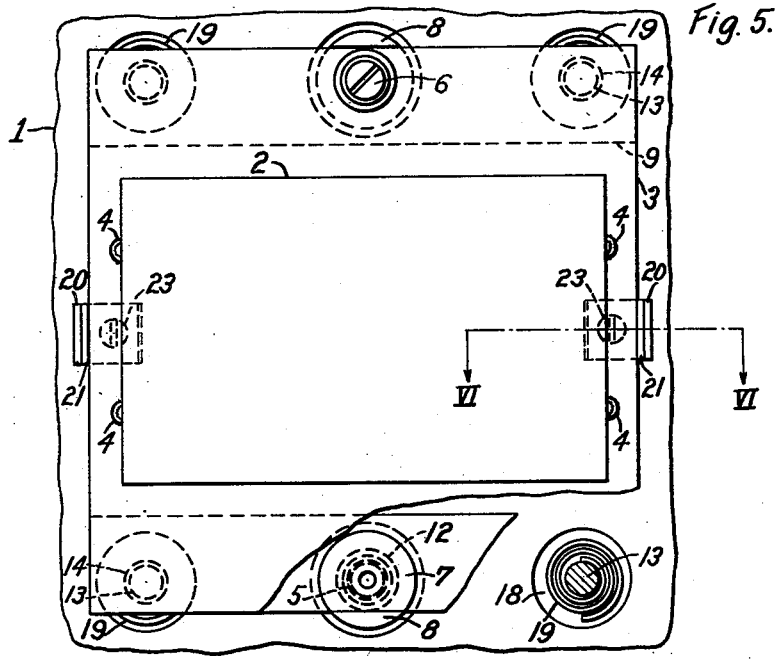
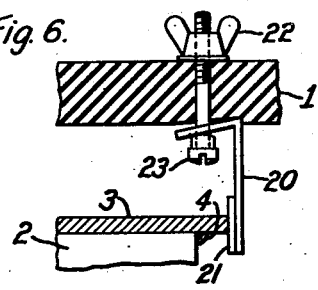
WITNESSES:
Wm. B. Sellers
Nw. C. Groome
INVENTOR
Walter Schaelchlin.
BY
Paul E. Friedmann
ATTORNEY June 17, 1941. W. SCHAELCHLIN 2,246,323
SHOCK AND VIBRATION PROOF MOUNTING FOR CONTROL APPARATUS
Filed Nov. 6, 1937 3 Sheets-Sheet 3

WITNESSES:
Wm. B. Sellers
Nm. C. Groome

INVENTOR
Walter Schaelchlin.
BY
Paul E. Friedemann
ATTORNEY

Patented June 17, 1941

2,246,323

UNITED STATES PATENT OFFICE 2,246,323

SHOCK AND VIBRATION PROOF MOUNTING FOR CONTROL APPARATUS

Walter Schaelchlin, Wilkinsburg, Pa., assignor to Westinghouse Electric & Manufacturing Company, East Pittsburgh, Pa., a corporation of Pennsylvania Application November 6, 1937, Serial No. 173,188

12 Claims. (Cl. 248—358)

My invention relates to supports for mechanisms, and more particularly to shock and vibration eliminating supports for electrical control apparatus.

On board battleships, or other marine fighting crafts, as well as with electrically controlled guns on armored trains, or on heavy tanks, it is extremely important that the electrical control apparatus be not affected by gun shock or other impacts.

Further, shocks and vibrations of excessive magnitude, such as occur for instance on board vessels, are apt to cause failure of the propulsion control as well as a shut-down of auxiliary electrical apparatus at a time when the continuity of service is of vital importance, as for instance during battle.

Shocks of medium magnitude are usually taken care of by rugged and adequate design of the parts and suitable proportioning of the operating forces in relation to the maximum shocks or impacts expected in order to offset the forces of the shock or impact. If, however, the impulse or force is excessive, the above suggested method is no longer adequate. This is especially true for relatively small apparatus in which the parts are light and in which the operating forces are low.

Shocks alone might be prevented from impairing the operation of control apparatus by the use of resiliently mounted supports, which supports include springs or other flexible elements. Such supports, however, permit free vibration of the apparatus to be protected and thus introduce the danger of resonant vibrations and the consequent ultimate breakdown of the resilient members. This is particularly true for applications on board ship where the frequency of vibration varies over a wide range.

One object of my invention is to eliminate from apparatus mounted on a support the effect of both vibrations and shocks imparted to the support.

Another object of my invention is to provide for rigidly holding a piece of apparatus on a support for all vibrations of the support below a given magnitude but to provide for somewhat free movement of the apparatus relative to the support for all vibrations of the support above the said given magnitude.

A further object of my invention is to prevent concurrent acceleration of a support and of a piece of apparatus mounted on the support when such acceleration exceeds a given value.

A still further object of my invention is to provide a rigid connection between the bulk head, or other parts of the structure of a ship, and the operating devices mounted thereon but which connection becomes flexible when the bulk head is subjected to shocks.

It is also an object of my invention to provide for mounting a device on a support so that there is relative movement between the support and the device only when the support is subjected to impacts.

Other objects and advantages of my invention will become more apparent from a study of the following specification and the accompanying drawings, in which:

Fig. 4 is a plan view, partly in section, similar to the showing in Fig. 1, of a modification of my invention;

Fig. 5 is a front view, with parts broken away, of the subject matter shown in Fig. 4;

Fig. 6 is a detail, taken on section line VI—VI of Fig. 5, showing a vibration damping device such as may be used with the modification shown in Figs. 4 and 5.

Figure 1:
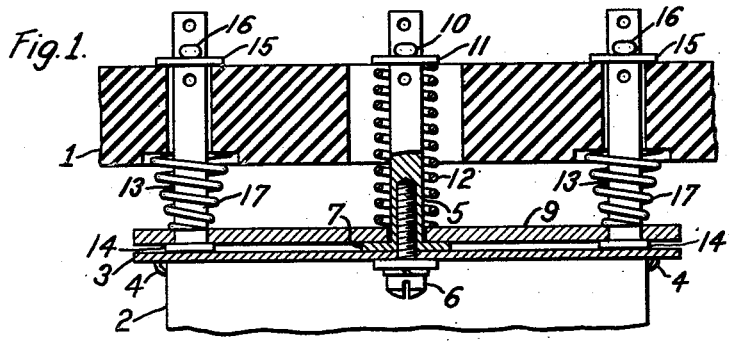
Figure 1 is a plan view, partly in section, of my invention, as mounted on a support, which support is shown only in part and also in section, and also shows my invention holdig a piece of apparatus illustrated schematically.

A resilient mounting for electrical control apparatus could, of course, be designed to give the requisite protection when the ship is in battle, but the experience of the men in the United States Navy convinced them that resilient interconnecting devices between a piece of apparatus and the bulk head, or other structure of a ship, are very unsatisfactory. There is always vibration on board ship, which vibration is of irregular frequency but most significantly is uninterrupted. Springs or other resilient devices thus fail because of "fatigue" and crystallization of the spring material.

Referring to Figs. 1, 2, 4 and 5, the reference character 1 designates a support or base which may be a ship's bulk head or other structure and to which the device or piece of apparatus 2, such as a relay or a contactor for controlling electric apparatus on board ship, is to be connected. For convenience, I shall hereafter designate the device 2 a relay. The relay is rigidly mounted on a frame or plate 3 in any suitable manner, for example, the control device or relay may be rigidly secured to the plate 3 by spot welds 4, as shown in Figs. 1, 2, 4 and 5, or may be secured by means of screws or rivets, or any other satisfactory means.

At each end, that is, the upper end and the lower end, the plate 3 is rigidly secured to a stud 5 by a screw 6. The studs 5 are each internally threaded at one end and each has a washer-like end 7 at the threaded end, the washer-like portion being provided with a segment 8 projecting at right angles to the plane of the washer-like end. The segments 8 on each stud are, when in position, so disposed as to engage the ends of plate 3. Any tendency of a relative movement between the plate 3 and studs 5 is thus prevented. The screws 6 are driven down into the studs and with the aid of lock washers and the mentioned segments provide for a rigid connection between the plate 3 and the studs 5.

The studs 5 pass quite loosely through openings in the middle of bars 9 disposed at each end of plate 3. The rear end of each stud is provided with a cotter key 10 and washer 11 and a spring 12 under a predetermined compression. The bars 9 are thus held firmly against the rear face of the washer-like end 7. The positioning means for spring 12, comprising the washer 11 and cotter key 10, are the cheapest and for many applications the preferred construction. If, however, very accurate adjustment of the compression of spring 12 is desired then the spring positioning means may comprise a washer and an adjustable nut disposed on the rear end of stud 5. The compression of the spring may also be adjusted by selecting the proper hole of a plurality of holes disposed in the stud 5 for the positioning of the cotter key.

From the foregoing description, it will be apparent that the plate 3, and the bar 9 can only be moved away from each other and that only after the predetermined compressive force of spring 12 is overcome.

Each end of each of the two bars 9 is provided with an opening to slidably receive a stud 13 having the head 14 engaging the front side of bar 9. The studs 13 are each provided with a washer 15, a cotter key 16—a structure exactly like the studs 5—however, in this instance the washer 15 engages the rear face of support 1 through which support 1 the studs 13 pass. The openings through the support 1 are sufficiently large to give the studs 13 considerable clearance, however, not so much as not to prevent engagement of the studs 13 with the support in the event of considerable angular motion of the studs 13 with reference to the support.

Disposed in recesses in the front face of the support and positioned between the bars 9 are compression springs 17. These springs are under a predetermined compression, which compression may be adjustable by the selection of the desired hole for cotter key 16.

Since the springs 17 firmly press the bars 9 against the heads 14 of the studs 13 by a predetermined pressure and the two springs 12 hold the bars 9 against the plate 3 by a predetermined pressure the plate 3 and thus the control device 2 is normally rigidly held on the support 1, yet if sufficient force is exerted on the control device in any direction, the control device becomes resiliently supported. Any impacts or shocks to which the support is subjected are thus not transmitted to the control device.

The magnitude of the force F necessary to provide a resilient support for the control device, that is, to protect the control device against shocks and impacts, can very readily be determined by the equation:

$F = Maw^2 \sin wt$, where

M = the mass of the control device 2 and the plate 3;
$t$ = time;
$w$ = frequency of vibration; and
$a$ = the amplitude of vibration.

Vibrations of a frequency of more than 12 cycles per second are generally not transmitted through the ship structure. Assuming that the maximum frequency is 12 cycles per second at an amplitude not to exceed one-eighth of an inch, then $F \geq 2M$.

It is very evident that this force is small in comparison to the impact and shock forces during gun-fire. Any impacts by reason of the firing of the vessel's guns or any shells or bombs hitting the vessel, other than hits of such magnitude to completely disable the ship, will not interfere with the shock-proofness of my mounting structure for the control device.

The clearances I have shown for the studs 5 and 13 are such that as the device 2 is moved angularly with reference to the support 1, the studs 13 engage the support 1 and studs 5 engage the bars 9. This frictional engagement produces a damping effect on the vibrations of the device 2 when the support 1 has been subjected to an impact.

To make the damping effect mentioned in the preceding paragraph controllable, I provide the modification shown in Figs. 4, 5 and 6. In this modification, like parts are designated by the same reference characters.

Figure 2:
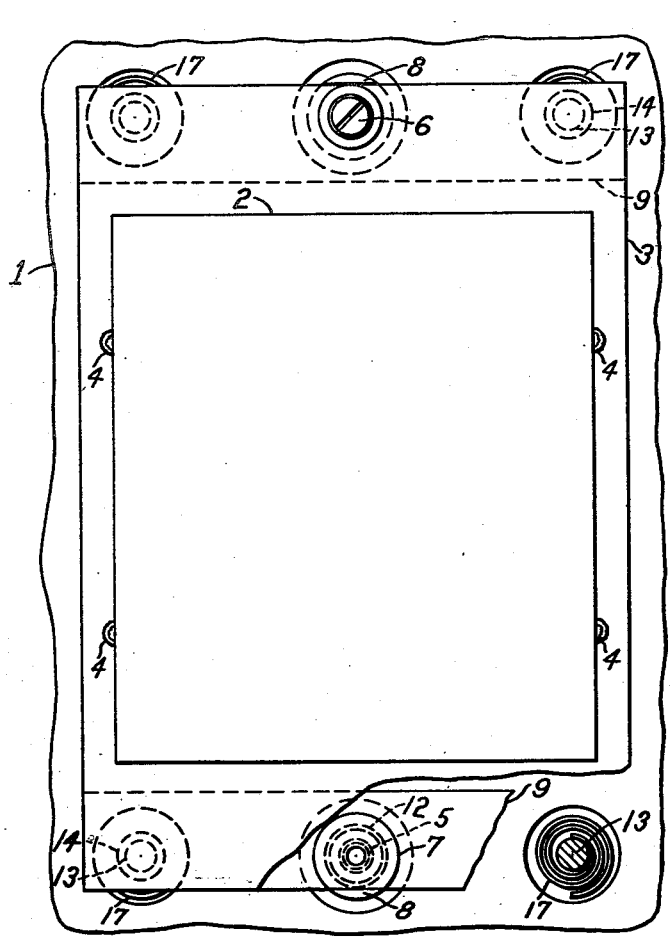
Fig. 2 is a front view, with parts broken away, of the subject matter shown in Fig. 1.
Figure 3:
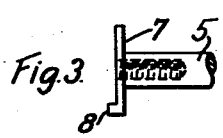
Fig. 3 is a detail showing of one end of a supporting stud.

In this modification, the machine elements or parts 1, 2, 3, 4, 5, 6, 7, 8, 10, 11, 12, 15 and 16 are, in structure and function, exactly like the same elements or parts shown in Figs. 1, 2 and 3. The studs 13, however, have their heads 14 spot-welded or otherwise rigidly secured to the bars 9. The openings in the support 1 for the studs 13 are much larger so that the studs do not at any time during movement frictionally engage the support.

To assure that the studs always remain substantially central of the openings for the studs, each stud is provided with a spacing washer 18 so positioned in a recess in the support 1 that any angular movement of the device 2 may be made freely in the event of an impact on the support 1.

A compression spring 19 is disposed on each stud 13 between the washer 18 and the bars 9 and thus firmly hold the bars 9 at a certain distance from the support 1.

To dampen the vibrations of device 2 on support 1 in the event of a severe impact given to the support 1, I provide a pair of pivoted L-shaped flat springs 20 of the construction shown in Fig. 6. These springs may be provided with friction members 21 for engagement with the plate 3. By operating the wing-nut 22 on the bolt 23, the friction effect of spring 20 and the friction member 21 may be adjusted to any value desired. The force of friction needs to be relatively small only to produce the desired effect. In no case should the force of friction be near equal to the force F. To make the force of friction equal to or larger than the force F would cause the device to stick.

If the device 2 should thus be caused to stick in an extreme position, the novel results I secure with my mounting may be nullified.

The complete combination giving the most refined protection includes a normally rigid spring controlled mounting for device 2, which mounting becomes a resilient mounting when forces or impacts of a value greater than a predetermined value act on the device 2, and adjustable means for damping the vibrations of device 2.

The damping feature shown in Figs. 4, 5 and 6 is not an absolutely necessary feature to make my device complete. The vibrating motion of device 2 is at most only temporary so that damped oscillations are not as important as a flexible or resilient mounting for the device 2 when the support is subject to shocks.

Figure 7:
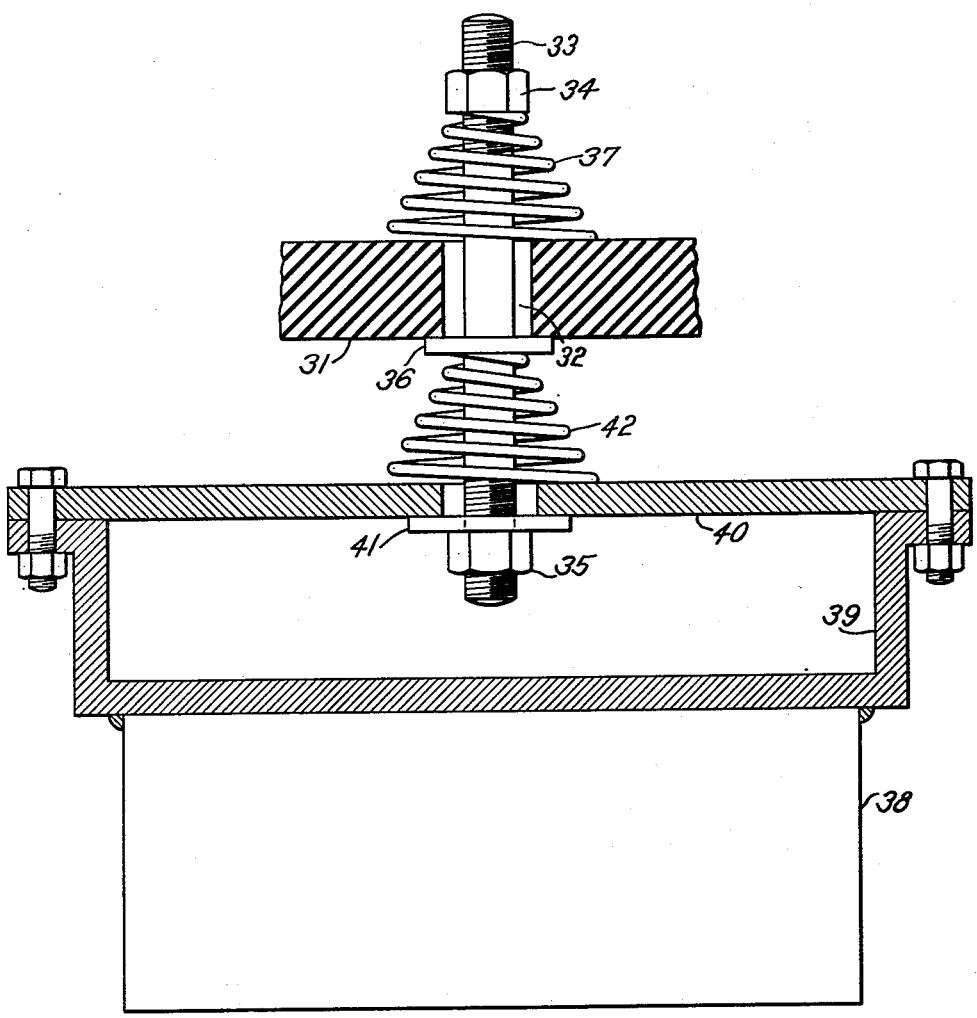
Fig. 7 shows a very simple modification of my invention.

A still simpler arrangement of my invention is illustrated in Fig. 7. In this Fig. 7, reference character 31 represents some rigid member rigidly secured, for example, to the bulk head of a ship. The member 31 is provided with an opening 32 through which a stud 33 is extended.

The stud 33 is threaded at both ends to receive nuts 34 and 35 and the mid-portion of the stud is provided with an annular ledge 36 integral with the stud, or with a washer that is either shrunk on the stud or welded to it. The member 31 is disposed between the nut 34 and the ledge 36 and a compression spring 37 is disposed between the member and the nut 34. The ledge 36 is thus pressed against the member 31 by a predetermined force depending on the compression of spring 37. The compression of spring 37 may, of course, be adjusted to any value desired within the limits of the adjustment of nut 34 and the capacity of spring 37.

The structure of Fig. 7 thus far discussed clearly permits the stud 33, and any piece of apparatus mounted thereon, to be moved in any direction forward of member 31 but stud 33 is held rigidly on member 31 with regard to any forces acting on stud 33 toward the member 31. Furthermore, before the stud can be moved forwardly or angularly or both forwardly and angularly the force of spring 37 has to be overcome. In other words the stud is normally rigidly mounted on member 31 and is movable only in the restricted manner by forces in excess of a given magnitude and having a component, or a resultant, acting from a point substantially in ledge 36 in any direction of the hemisphere to the front of the member 31.

The front of the stud 33 carries a piece of apparatus 38, the apparatus being rigidly mounted on a U-shaped member 39 bolted or otherwise rigidly secured to the bar 40 mounted on the stud 33. The bar 40 is held on the stud 33 by the nut 35 and a washer 41 disposed on the front side of bar 40 and a spring 42 disposed at the rear of bar 40. The spring 42 is a compression spring under a predetermined compression depending on the adjustment of nut 35 on the stud 33. The opening in bar 40 is large with reference to the diameter of the stud 33 so that the bar 40 and thus the apparatus 38 can move freely on the stud.

The freedom of movement is, however, a controlled one. The bar 40 cannot be moved forwardly with reference to stud 33 and can be moved in any direction in the hemisphere to the rear of washer 41 only by forces in excess of the compressive force of spring 42.

The total result of the apparatus disclosed in Fig. 7 is that the device 38 can be moved in any direction on member 31 by forces or impacts acting on member 31 in excess of a given value. Normally, the device or piece of apparatus 38 is held rigidly on the support or member 31 but in the event of impacts on the support, the device 38 becomes resiliently mounted.

I am, of course, aware that others, particularly after having had the benefit of the teachings of my invention may devise other types of structure for accomplishing the same novel results. Therefore, I do not wish to be limited to the particular structure herein disclosed and illustrated in the figures of the accompanying drawings, but wish to be limited only by the pertinent prior art and the scope of the claims presented.

I claim as my invention:

1. In a supporting structure for a device, in combination, a device, a base having an aperture therethrough, a member disposed at one side of the base but extending through the aperture a predetermined distance and engaging the one, or first, side of the base, resilient means, engaging the member and the other, or far, side of the base, adapted to bias the member to a given direction so that the force of engagement of the member with the first mentioned side of the base is a given value, and resilient means mounted on the member and adapted to bias the said device by a predetermined force against the portion of the member not extending through the aperture.

2. A support for a device, in combination, a base having an opening, a device having a frame structure, a bar having an opening therethrough, a stud, rigidly connected to the frame, extending through the opening in the bar, a collar near the end of the stud extending through the opening, a spring subjected to a predetermined compression disposed between the collar and the bar and thus adapted to bias the bar against the frame of the device with a predetermined force, a second stud, rigidly connected to the bar, extending through the opening in the base and having hooked engagement with the base at the end extending through the base, and a spring, subjected to a predetermined compressive force, disposed between the bar and the base to thus make the said hooked engagement of a predetermined force.

3. In a support for a device, in combination, a base having an opening, a stud extending loosely through the opening and having a pair of stops, one stop engaging the regions adjacent the opening whereby the stud can not be moved in one direction with reference to the base, resilient means for biasing the stud so that the stop engages the regions adjacent the opening with a predetermined force, means for adjusting the biasing force of said resilient means, a device having an opening for loosely receiving said stud, resilient means mounted on the stud adapted to bias said device against the second stop on the stud with a predetermined force, means adapted to adjust the biasing force of said resilient means.

4. In a support for a device, in combination, a base having an opening, a stud extending loosely through the opening and having a pair of stops, one stop engaging the regions adjacent the opening whereby the stud can not be moved in one direction with reference to the base, means for biasing the stud so that the stop engages the regions adjacent the opening with a predetermined force, a device having an opening for loosely receiving said stud, means mounted on the stud adapted to bias said device against the second stop on the stud with a predetermined force.

5. A mounting for a device that is to be protected against impacts to the base upon which the device is carried, in combination, a member having three spaced stops, a device disposed between the first and second stop, resilient means disposed between the device and second stop whereby the device is biased against the first stop by a predetermined force, a base disposed between the second and the third stop, resilient means disposed between the base and the third stop whereby the second stop is biased against the base by a predetermined force.

6. A supporting structure for a device, in combination, a device, a base, a floating supporting member resiliently connected to the device and the base, said resilient connecting means comprising resilient means disposed between the device and the floating member acting in one direction and biasing the device toward the floating member, and further resilient means acting in the opposite direction and biasing the floating member and thus the device in the opposite direction.

7. A supporting structure for a device, in combination, a device, a base, a floating supporting member resiliently connected to the device and the base, a stop on the floating member, said resilient connecting means comprising resilient means disposed between the device and the floating member acting in one direction and biasing the device toward the stop on the floating member, and further resilient means acting in the opposite direction and biasing the floating member and thus the device in the opposite direction.

8. A supporting structure for a device, in combination, a device, a base, an intermediate floating supporting member having portions extending to positions on each side of the base, biasing means for biasing the said device in one direction toward a portion of said intermediate member disposed at one side of the base, and biasing means acting in an opposite direction for biasing said intermediate member, and thus the device, toward the said base, whereby said device is free to move in one direction against one biasing means only or in the other direction against the other biasing means only.

9. A supporting structure for a device, in combination, a device, a base, a floating supporting member resiliently connected to the device and the base, a stop on the floating member, said resilient connecting means comprising resilient means disposed between the said stop and a portion of the base acting in one direction to bias the floating member against the base, and further resilient means acting in the opposite direction and biasing the device against the floating member.

10. A supporting structure for a device, in combination, a device, a base, a floating supporting member resiliently connected to the device and the base, said resilient connecting means comprising resilient means disposed between the device and the floating member acting in one direction and biasing the device toward the floating member, further resilient means acting in the opposite direction and biasing the floating member and thus the device in the opposite direction, and means for adjusting the biasing effect of said resilient means.

11. A supporting structure for a device, in combination, a device, a base, a floating supporting member resiliently connected to the device and the base, a stop on the floating member, said resilient connecting means comprising resilient means disposed between the device and the floating member acting in one direction and biasing the device toward the stop on the floating member, further resilient means acting in the opposite direction and biasing the floating member and thus the device in the opposite direction, and means for adjusting the biasing effect of said resilient means.

12. In a supporting structure for a device, in combination, a device, a base, a sub-base having portions extending to positions on each side of the base, biasing means adapted to bias, with a predetermined force, the said device toward the said portions of said sub-base disposed at one side of the base, biasing means adapted to bias, with a predetermined force, the said portions of the sub-base disposed on the other side of the base toward the base, and means adapted to make the action of said two biasing means independent of each other, whereby said device can only be moved with reference to the said base by forces respectively in excess of either of the biasing forces of said two biasing means.

WALTER SCHAELCHLIN.